US006205510B1

(12) United States Patent
Mendel

(10) Patent No.: US 6,205,510 B1
(45) Date of Patent: *Mar. 20, 2001

(54) METHOD FOR FENCING A MEMBER OF A GROUP OF PROCESSES IN A DISTRIBUTED PROCESSING ENVIRONMENT

(75) Inventor: Gili Mendel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/124,677

(22) Filed: Jul. 29, 1998

(51) Int. Cl.[7] .............................. G06F 12/00; G06F 17/60
(52) U.S. Cl. .............................. 711/1; 709/220; 711/154; 711/156; 711/159
(58) Field of Search ................................... 711/162, 154, 711/165, 201, 1, 156, 159; 714/7–8, 4; 709/220; 370/254, 258

(56) References Cited

U.S. PATENT DOCUMENTS

| | | | |
|---|---|---|---|
| 4,683,563 | * 7/1987 | Rouse et al. | 370/224 |
| 4,919,545 | 4/1990 | Yu | 380/25 |
| 5,301,283 | 4/1994 | Thacker et al. | 395/325 |
| 5,313,585 | * 5/1994 | Jeffries et al. | 711/201 |
| 5,386,551 | 1/1995 | Chikira et al. | 395/575 |
| 5,416,921 | 5/1995 | Frey et al. | 395/575 |
| 5,423,044 | 6/1995 | Sutton et al. | 395/725 |
| 5,568,491 | * 10/1996 | Beal et al. | 714/746 |
| 5,675,724 | * 10/1997 | Beal et al. | 714/4 |
| 5,963,963 | * 10/1999 | Schmuck et al. | 707/205 |
| 5,991,264 | * 11/1999 | Croslin | 370/225 |
| 5,996,075 | * 11/1999 | Matena | 713/200 |
| 5,999,712 | * 12/1999 | Moiin et al. | 395/200.5 |
| 6,038,604 | * 3/2000 | Bender et al. | 709/233 |

OTHER PUBLICATIONS

Aldred, M. "A Distributed Lock Manager on Fault Tolerant MPP", System Sciences, pp. 134–136, 1995.*
Sankar, R., et al., An Automatic Failure Isolation and Reconfiguration Methodology for Fiber Distributed Data Interface (FDDI), Communications, pp. 186–190, 1992.*
Chung–Sheng Li et al., Automatic Fault Detection, Isolation, and Recovery in Transparent All–Optical Networks, Journal of Lightwave Technology, pp. 1784–1793, Oct. 1997.*
Y. Ofek et al., Generating a Fault–Tolerant Global Cock Using High–Speed Control Signals for the MetaNet Architecture, IEEE Transactions on Communications, pp. 2179–2188, May 1994.*
G. Alari et al., "Fault–Tolerant Hierarchical Routing", IEEE International Conference on Performance, Computing, and Communications, pp. 159–165, 1997.*

* cited by examiner

Primary Examiner—Reginald G. Bragdon
Assistant Examiner—Pierre-Michel Bataille
(74) Attorney, Agent, or Firm—Floyd A. Gonzalez; Lawrence D. Cutter

(57) ABSTRACT

A method for use in a distributed processing system having a plurality of nodes wherein selected nodes are fenced or unfenced from selected ones of peripheral device server nodes in a fence/unfence operation. A common memory is provided for storing a fence map listing nodes fenced from server nodes. In the fence/unfence operation, a request processing node proposes changes to the fence map, and if no node fails during the fence/unfence operation, the proposed changes are changed into committed changes. If a node fails during the fence/unfence operation, the proposed changes are erased, the previous committed changes are restored, and the fence/unfence request is removed from the process queue for processing by the request processing node.

10 Claims, 7 Drawing Sheets

SDR-114

| FENCE MAP | | 202 |
|---|---|---|
| FLAG | COMMIT FLAG | BIT MAP |
| $V_1$ | 0 | 9 |
| $V_2$ | 0 | 9,6 |
| $V_3$ | 0 | 9 |
| $V_4$ | 0 | 9 |
| $V_2$ | 1 | 9,7 |
| $V_1$ | 1 | 9,7 |
| $V_3$ | 1 | 9,7 |
| $V_4$ | 1 | 9,7 |

Rows 1–4 are labeled 204. Rows 5–8 are labeled 205, with individual markers 206 ($V_2$), 207 ($V_1$), 208 ($V_3$), 209 ($V_4$).

FIG.3

SDR-114

| FENCE MAP | | 202 |
|---|---|---|
| FLAG | COMMIT MAP | BIT MAP |
| $V_2$ | 0 | 9,7 |
| $V_1$ | 0 | 9,7 |
| $V_3$ | 0 | 9,7 |
| $V_4$ | 0 | 9,7 |

FIG.4

METHOD FOR FENCING A MEMBER OF A GROUP OF PROCESSES IN A DISTRIBUTED PROCESSING ENVIRONMENT

"The present application is related to co-pending applications bearing Ser. No. 09/124,672 and Ser. No. 09/124,394 both of which were filed on the same day as the present application namely, Jul. 29, 1998, and both of which are assigned to the same assignee as the present invention."

The present invention is related to fencing of nodes in a distributed processing environment, and is more particularly related to fencing of nodes in a shared disk subsystem.

BACKGROUND OF THE INVENTION

U.S. Pat. No. 4,919,545 issued Apr. 24, 1990 to Yu for DISTRIBUTED SECURITY PROCEDURE FOR INTELLIGENT NETWORKS, discloses a security technique for use in an intelligent network and includes steps of granting permission to an invocation node to access an object by transmitting a capability and a signature from an execution node to the invocation node thereby providing a method for authorizing a node to gain access to a network resource by using a form of signature encryption at the node.

U.S. Pat. No. 5,301,283 issued Apr. 5, 1994 to Thacker et al. for DYNAMIC ARBITRATION FOR SYSTEM BUS CONTROL IN MULTIPROCESSOR DATA PROCESSING SYSTEM discloses a data processing system having a plurality of commander nodes and at least one resource node interconnected by a system bus, and a bus arbitration technique for determining which commander node is to gain control of the system bus to access the resource node thereby providing a node lockout which prevents nodes from gaining access to the system bus.

U.S. Pat. No. 5,386,551 issued Jan. 31, 1995 to Chikira et al. for DEFERRED RESOURCES RECOVERY discloses a resources management system for fencing all autonomous resources, and a protocol is followed to allow all activities in a work stream to be completed before all fencing is removed.

U.S. Pat. No. 5,416,921 issued May 16, 1995 to Frey et al. for APPARATUS AND ACCOMPANYING METHOD FOR USE IN A SYSPLEX ENVIRONMENT FOR PERFORMING ESCALATED ISOLATION OF A SYSPLEX COMPONENT IN THE EVENT OF A FAILURE discloses an apparatus for use in a multi-system shared data environment which fences through a pre-defined hierarchical order, failed components from accessing shared data in order to protect data integrity.

U.S. Pat. No. 5,423,044 issued Jun. 6, 1995 to Sutton et al. for SHARED, DISTRIBUTED LOCK MANAGER FOR LOOSELY COUPLED PROCESSING SYSTEMS discloses apparatus for managing shared, distributed locks in a multiprocessing complex for synchronizing data access to identifiable subunits of direct access storage devices.

The Virtual Shared Disk (VSD) product, which is a component of the Parallel System Support Programs for AIX (PSSP) from the International Business Machines Corp. of Armonk, N.Y., provides raw disk access to all nodes on a RS/6000 Scalable POWERparallel (SP) system. The disk itself, however, is physically connected to only two nodes. One of these nodes is a VSD primary server, and the other is a backup server. If a disk is not locally attached, the VSD kernel extension will use Internet Protocol to route the requests to the server node. If the primary node is unavailable for any reason, access is switched to the secondary node, and the data on the disk drive may still be accessed by the secondary node.

The Group Services product of PSSP keeps a record of member nodes in a group of nodes. It is desirable to provide a fencing function to the VSD subsystem to provide fencing support.

In the case that a process instance using VSDs on node X is unresponsive, a distributed subsystem may wish to ensure that X's access to a set of virtual disks (VSDS) is severed, and all outstanding I/O initiated by X to these disks are flushed before recovery can proceed. Fencing X from a set of VSDs denotes that X will not be able to access these VSDs (until it is unfenced). Fence attributes must survive node Initial Program Loads (IPLs).

SUMMARY OF THE INVENTION

The present invention provides a distributed computer system having a plurality of nodes, one of the nodes being a request processing node (A node) and one or more nodes being peripheral device server nodes (S nodes), an apparatus for fencing or unfencing in a fence/unfence operation, and one or more nodes (X nodes) from said S nodes. The apparatus includes a common memory for storing a fence map having entries therein, each entry for storing an indication of an S node to be fenced, a commit bit indicating if the entry is proposed or committed, and a bit map indicating which X nodes are to be fenced from the S node of the entry. Each of the plurality of nodes includes a local memory for storing a local copy of said fence map. A node processes a request specifying X nodes to be fenced or unfenced from specified S nodes during said fence/unfence operation, and computes the nodes to participate (F nodes) in the fence/unfence operation. The participating nodes includes the A node, the X nodes to be either fenced or unfenced from said S nodes, and the S nodes thus fenced or unfenced. The A node sends messages to the F nodes instructing each F node to begin the fence/unfence operation for that node. The fence/unfence operation includes a first phase for proposing changes in the fence map reflecting the fencing or unfencing of said X nodes; a second phase for refreshing the local map of each of the F nodes from the proposed changes in the fence map in said central memory, for eliminating access to specified S nodes from specified X nodes to be fenced, if any, and for restoring access to specified S nodes with specified X nodes is to be unfenced, if any; and a third phase for flushing I/O operations from specified X nodes to be fenced from specified S nodes, if any, and for a selected one of the F nodes to erase all entries in the fence map of the common memory whose commit bit indicates the entry is committed, and for changing all entries whose commit bit indicates the entry is proposed, to a committed entry.

Thus a primary object of the present invention is to provide a method for fencing selected ones of the X nodes from access to selected ones of the S nodes, and for unfencing selected ones of said X node such that they have access to selected ones of said S nodes.

It is also an object of the present invention to provide a method for the lowest numbered node of the F nodes to change proposed changes to the fence map stored in the common memory to committed entries at the end of the fence/unfence operation.

It is another object of the present invention to provide a method for allowing any node of the plurality of nodes to send a request to the A node to start a fence/unfence operation.

It is another object of the present invention to provide a method wherein a protocol undoes the proposed changes to the fence map in the event that a node fails during the fence/unfence operation.

It is another object of the present invention to provide a method wherein a protocol removes the request from the request queue for processing by the A node in the event that a node fails during the fence/unfence operation.

The foregoing and other objects, features and advantages of the invention will be apparent from the following more particular description of the preferred embodiment of the invention as illustrated in the drawings.

BRIEF DESCRIPTION OF THE DRAWINGS

FIG. 3 is a diagram of a fence table stored in the system data repository (SDR) of the system of FIG. 1, fence table including both committed entries of a previous fence/unfence operation, and proposed entries of the present fence/unfence operation of the present invention;

FIG. 4 is a diagram of the fence table of FIG. 3 with the proposed entries of the present fence/unfence operation changed to committed entries;

DESCRIPTION OF THE PREFERRED EMBODIMENT

Figure 1:
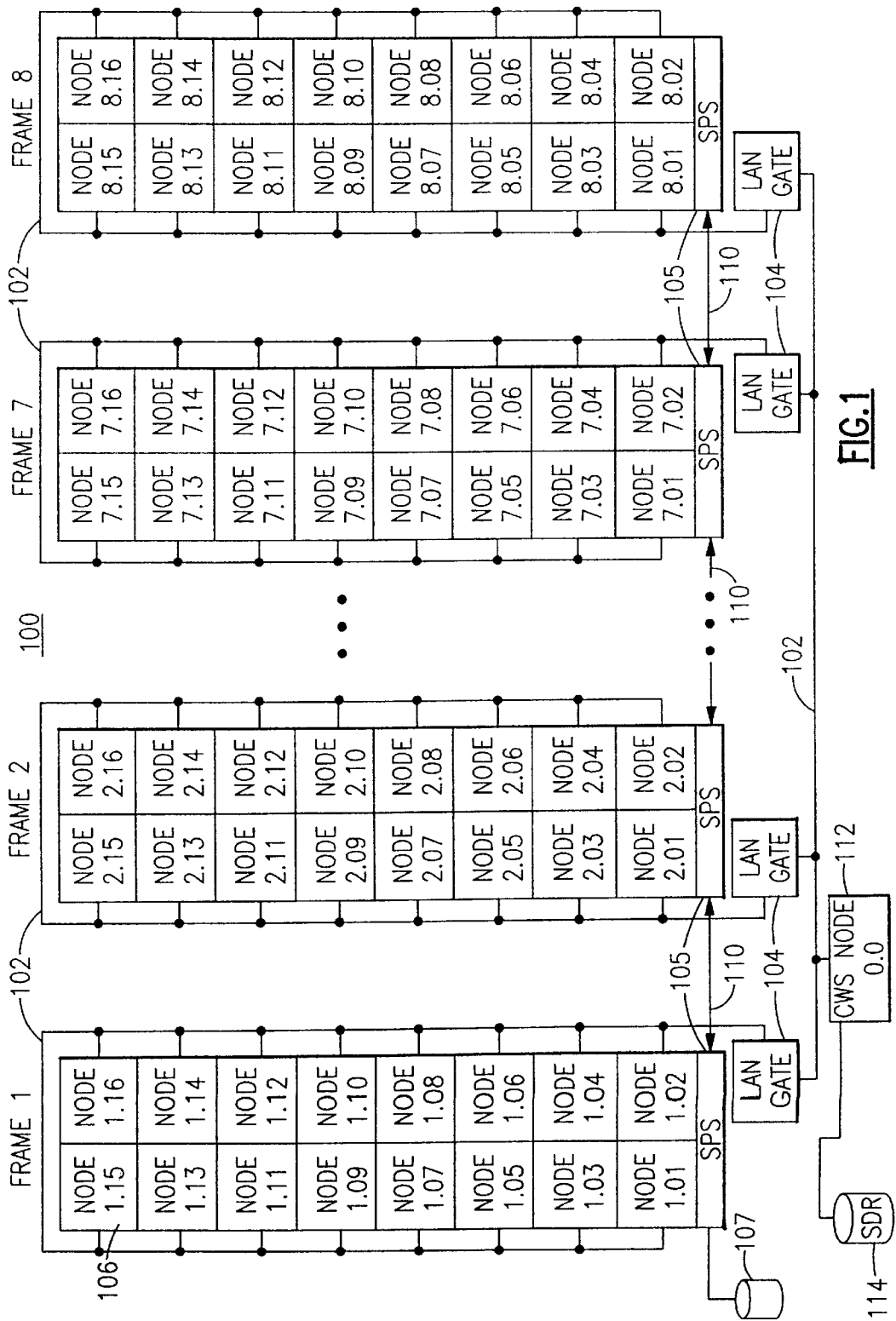
FIG. 1 is a schematic diagram of a distributed computer system usable with the present invention.

The VSD subsystem is an abstracting layer that simulates a shared disk model. Issuing a fence request on node A to fence node X from VSDs (that are served by node S) imply that node A must have a reliable mechanism to talk to S (and X, if X is still up). This is achieved by the recoverable aspects of Recoverable VSD (RVSD). The RVSD product, also available from International Business Machines Corp., is designed to work in the "sometimes uncertain" and changing status of nodes in the cluster. This is the targeted time window for which a distributed instances will require the fence function to be satisfied by RVSD.

Given that a fence operation requires the following:
1. Route the fence request to the Server/s Fenced nodes.
2. Actually fence the designated nodes.
3. Flush I/Os from the fence nodes on all the VSD servers.
4. Commit the fence request in a common registry (SDR).

and given the high probability of failures (nodes, networks, resource allocations) during the fence operation (which could take up to a matter a few minutes for many VSDs and designated nodes), a simple, regular (Finite State Automaton) algorithm to achieve the fencing function, reliably, tolerating failures at any stage of the protocol was needed.

This implementation of the fence function marks the fenced VSDs on the clients (vs. denoting the fence nodes to the server). This reduces the memory and CPU utilization during normal operations of a VSD server. After a VSD client is marked "fenced", the server still needs to flush outstanding I/O before the fence request is satisfied. Given that RVSD is employed, if a client node, C, is considered dead, it is not necessary to mark the fenced VSDs on C, as RVSD will guarantee that C has NO access to any VSD as part of a node recovery procedure. When C comes up and reintegrates with RVSD (say C was rebooted), it will have to consult a common registry as a condition for its re-integration.

The fence protocol is a 3 phase protocol that is driven by the Group Services (GS) infrastructure of PSSP. A group services protocol comprises the following:

a. A RVSD instance proposes to initiate a barrier synchronization protocol.

b. If no RVSD protocol is currently driven, all RVSD instances are notified to the first phase of the state change protocol.

c. Each RVSD instance performs its "phase 1" tasks, and votes 'continue', with a default vote of 'continue'. At this time RVSD waits for the "phase 2" notification (which will come when all RVSD instances complete their votes).

Note:
  The 'continue' vote means that an additional phase is needed. Group services will continue to drive the protocol, so long as any RVSD instance votes 'continue.' GS stops the protocol if any instance votes 'reject' or when ALL RVSD instances votes 'approve.'
  The default vote denotes the action that GS takes in the case that one or more RVSD instances fails during the protocol. The default vote of 'continue' means that in the case that a RVSD instance/s die during the protocol, GS will continue to drive the protocol, with a "default vote" of approve.

d. In the last phase, each RVSD instance votes 'approve' and the fence protocol completes.

Note:
  GS drives ONE protocol at the time.
  Node failure protocols have precedence to regular barrier protocols.
  In the case of failure, GS will indicate the failure with a 'default vote' in the next phase (given that 'approve' was a default). If a 'reject' was the default vote, then GS will notify all surviving instances on the rejection of the protocol.
  In the case of a 'default approve vote' there is no mechanism to determine which node failed.

A command and fence map is shown in Table I, as follows;

TABLE I

| VSD | Commit Flag | Bit Map |
|-----|-------------|---------|
| $V_1$ | 0 | 9 |
| $V_2$ | 0 | 9, 6 |
| $V_3$ | 0 | 9 |
| $V_4$ | 0 | 9 |

Where:
  the VSD column indicates the VSD entry for a VSD instance;
  the Commit Flag records whether this entry is committed (a '0' value) or proposed (a '1' value); and
  the Bit Map records the node number(s) of the nodes fenced from this VSD entry.

It will be understood that only VSDs that are fenced are recorded in the registry. VSDs that are not fenced by any node will be removed from the fence map.

Hereinafter, 'F' will be the set of nodes which participate in the fencing operation, 'X' is the set of nodes to be fenced or unfenced in the operation, 'S' is the set of server nodes, and 'A' is the node to which the fencing operation is submitted.

Given the above GS semantics, the fence protocol is implemented as following:
1. a fence/unfence request is submitted to an RVSD instance on node A with the intent to fence nodes denoted by X from VSDs served by nodes in S.
2. if not already fenced/unfenced, node A waits until no protocol is being driven.
   2.1 node A proposes a fence protocol (if collided with another protocol, go back to 2.) and wait for phase 1 notification. The default vote in this case is reject.
      2.1.1 When notified on phase 1:
         2.1.1.1 node A will clean (remove any uncommitted records from the common registry), and augment the common registry with fence records marked "proposed" (vs. committed). These records denote the information needed by nodes in X and S to satisfy the fence function.
         2.1.1.2 If node A determines that all nodes in S are UP:
            2.1.1.2.1 node A will determine the set of nodes, F, that have to participate in the protocol. F is the union of X and S.
            2.1.1.2.2 node A will vote 'continue', with a default approve, and tag along a message denoting F.
         2.1.1.3 If not all nodes in S are up:
            2.1.1.3.1 node A will cleanup registry, and vote reject. In this case the fence request and fence protocol will fail.
         2.1.1.4 All other nodes in F will vote 'continue' immediately.
         2.1.1.5 All nodes not in F will vote with a 'default approve'.
      2.1.2 When notified on phase 2:
         2.1.2.1 All nodes accept F as a message from GS.
         2.1.2.2 Nodes in F:
            2.1.2.2.1 Consult the common registry for proposed records.
            2.1.2.2.2 nodes in X will fence the designated VSDs.
            2.1.2.2.3 nodes in F will Vote continue, with a default of approve.
         2.1.2.3 Nodes not in F:
            2.1.2.3.1 Mark current Fence knowledge as stale.
            2.1.2.3.2 Vote continue, with a default of approve.
      2.1.3 When notified on phase 3:
         2.1.3.1 a node in F (typically the node with the lowest number) will commit proposed records in the registry.
         2.1.3.2 Nodes in S will flush I/O for the designated VSDs.
         2.1.3.3 All nodes will vote 'approve' with a default of REJECT (to guard against the failure of the committing node).
   2.2 In the case of reject notification
      2.2.1 If the failure occurred in phase 3:
         2.2.1.1 All nodes in F refresh their information from the registry.
         2.2.1.2 node A goes back to step 2.

In the case that no failures occurred, the registry is updated with the new fence map (to be explained). (Note that the registry information survive nodes IPL, and with the solution of the HACWS product, also available from International Business Machines Corp., which is a high available registry service on the SP). Also, nodes in X will eliminate locally all VSD accesses, while nodes in S will flush all outstanding I/O operations to VSDs in question from nodes in X.

Failures

Any failure (RVSD process or communication link failures) during the protocol will be exposed to surviving RVSD instances in accordance to the default vote for GS.

In phase 1, a default reject is utilized, and thus the failure of node A will discard the protocol.

In phase 2, 3, failures (during phases 1 and 2) will be designated in the form of a default approve. In this case, nodes in F will restore with the committed copy of the registry (saved locally at the beginning of the protocol) to undo any VSD access changes. Node A will go back to step 2. A default vote implies there is a node failure. At this point RVSD will deal with the failure, and the fence request will be retried thereafter.

During the vote in phase 3, there is no way to tell if the smallest numbered node in F actually committed the registry or not (note that the registry must offer an atomic update). Thus all nodes vote with a default reject. In the case of a reject notification, all nodes in F will restore with the current committed records in the registry, to make sure that nodes in F and the registry are in sync. Node A will go to step 2. If the registry was committed, node A is done. If it was not then node A is most likely failed.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 on which is stored the system data repository files (SDR). The SDR files include such information as a list of nodes that are in the system and their configuration. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As well understood in the art, the CWS node 112 sends system data and control signals to the frames of the SP computer 100 by means of the LAN 102 while messages and data may be sent from one to another of the nodes 106 by means of the high performance switches 105.

Each of the nodes 106 and the CWS 112 of the SP computer system 100 includes a group services daemon, as explained in U.S. patent application Ser. No. 08/640,412 by P. R. Badovinatz et al. for "A Method for Managing Membership of a Group of Processors in a Distributed Computing Environment", assigned to the assignee of the present invention and incorporated herein by reference. Each of the nodes 106 may include software or hardware, or a combination, which reports to all the other nodes those nodes which are up and available for use. If any of the nodes 106 fails, its identity is made known to the other nodes by a process known as a heartbeat function. As is known, the nodes 106 of the SP computer system 100 may be divided into partitions.

Figure 2:
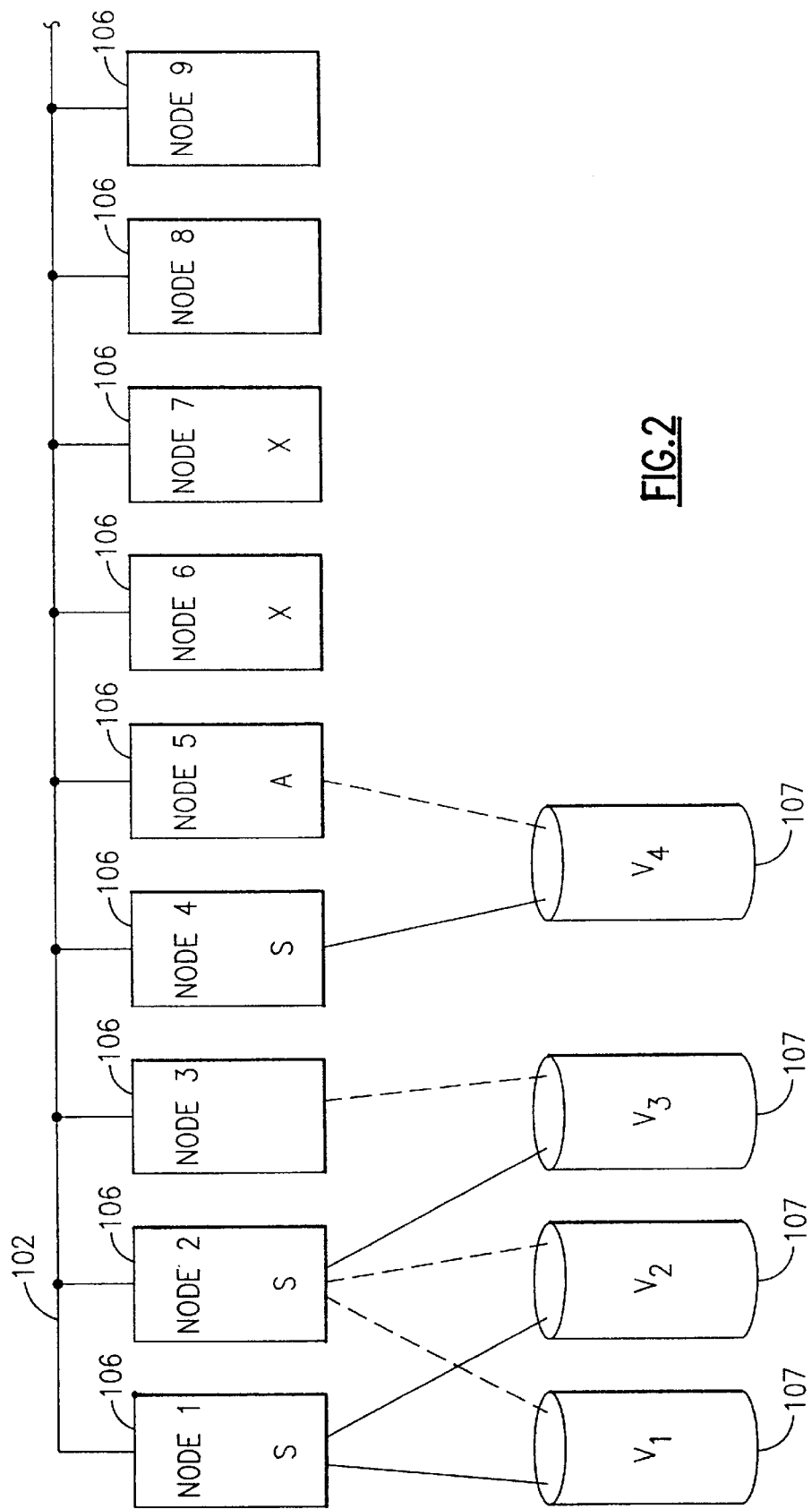
FIG. 2 is a portion of the system of FIG. 1 showing the nodes which participate in the fence/unfence operation of the present invention.

FIG. 2 is a portion of the system of FIG. 1 showing nine nodes (nodes 1–9) which may be any mix of the nodes 106 shown in FIG. 1. The system of FIG. 2 includes four DASD devices 107 herein referred to as VSDs and labeled $V_1$ to $V_4$. The primary server for $V_1$ and $V_2$ is Node 1, the primary server for $V_3$ is Node 2, and the primary server for $V_4$ is Node 4. The secondary server for $V_1$ and $V_2$ is node 2, the secondary server for $V_3$ is Node 3, and the secondary server for $V_4$ is Node 5. Nodes 2, 3, 5, 6, 7, and 8 are in a single group, and Node 5 is assigned the Group Leader (GL) by Group Services, and will perform the fencing operation (will be node A) in the present example. It will be understood any node can initiate a fence command by directing a fencing operation to node A.

FIG. 3 shows a portion of the SDR 114 which is available to all nodes in the system of FIG. 1. The SDR 114 includes a fence map 202 (also shown in Table I) which includes a list of all VSDs $V_1$–$V_4$ that are fenced from a node or nodes as shown in the bit map entry, a commit flag for each VSD which indicates if the entry is a proposed entry or a committed entry, and a bit map which contains a bit for each node that is fenced from the VSD of the entry. In the first portion 204 of the fence map 202 of FIG. 2, the committed entries indicate that VSDs $V_1$–$V_4$ are fenced from Node 9, and that VSD $V_2$ is also fenced from Node 6. The second portion 205 of the fence map 202 will be discussed further later. In the present example, Node A (Node 5 of the present embodiment) starts the protocol to fence Node 7 from VSDs $V_1$–$V_4$, and to unfence Node 6 from VSD $V_2$. The commands which start the protocol may be illustrated as follows:

Fence $(V_1,V_2,V_3,V_4)$7
Unfence$(V_2)$6.

In Phase 1 of the protocol, Node A computes the set F of nodes which will participate in the fence/unfence operation. Set F consists of the server nodes and those nodes which will be acted upon. In the present example, this will be Nodes 7, 6, 4, 2 and 1 (7 and 6 being the nodes being fenced and unfenced, and 4, 2 and 1 being the servers). Also in Phase 1, stale messages for the remaining nodes (Nodes 9, 8, 5 and 3) will be sent to notify those nodes that their local copies of the fence map is now stale, and updated copies will have to be read from the SDR 114. When each of the nodes respond OK, the protocol will enter Phase 2.

In Phase 2, the nodes in F reads the proposed changes in the fence map 202. Node 6 enables access to $V_2$ by adding an entry 206 to the proposed portion 205 of the fence map 202. Entry 206 is designated a proposed entry by setting its commit flag to 1. The entry 206 does not include a bit for Node 6, indicating that Node 6 is no longer fenced from $V_2$. Node 7 is fenced by blocking access to all the VSDs. This is done by setting the bit for Node 7 in the entries 206, 207, 208 and 209 for VSDs $V_1$, $V_2$, $V_3$, and $V_4$, respectively. Entries 207, 208 and 209 also have their commit flags set to 1 to indicate that these entries are proposed entries. The protocol then enters Phase 3.

In Phase 3, all of the server nodes (Nodes 1, 2 and 4) flush all I/O form nodes in X. The committed section 204 and the proposed section 205 of the fence map 202 are then merged to indicate that the proposed changes are now committed entries. If a failure of any of the nodes occurs, the fence protocol yields to the recovery protocol for RVSD such that when the fence protocol does complete, the committed fence map is up to date.

Figure 5A:
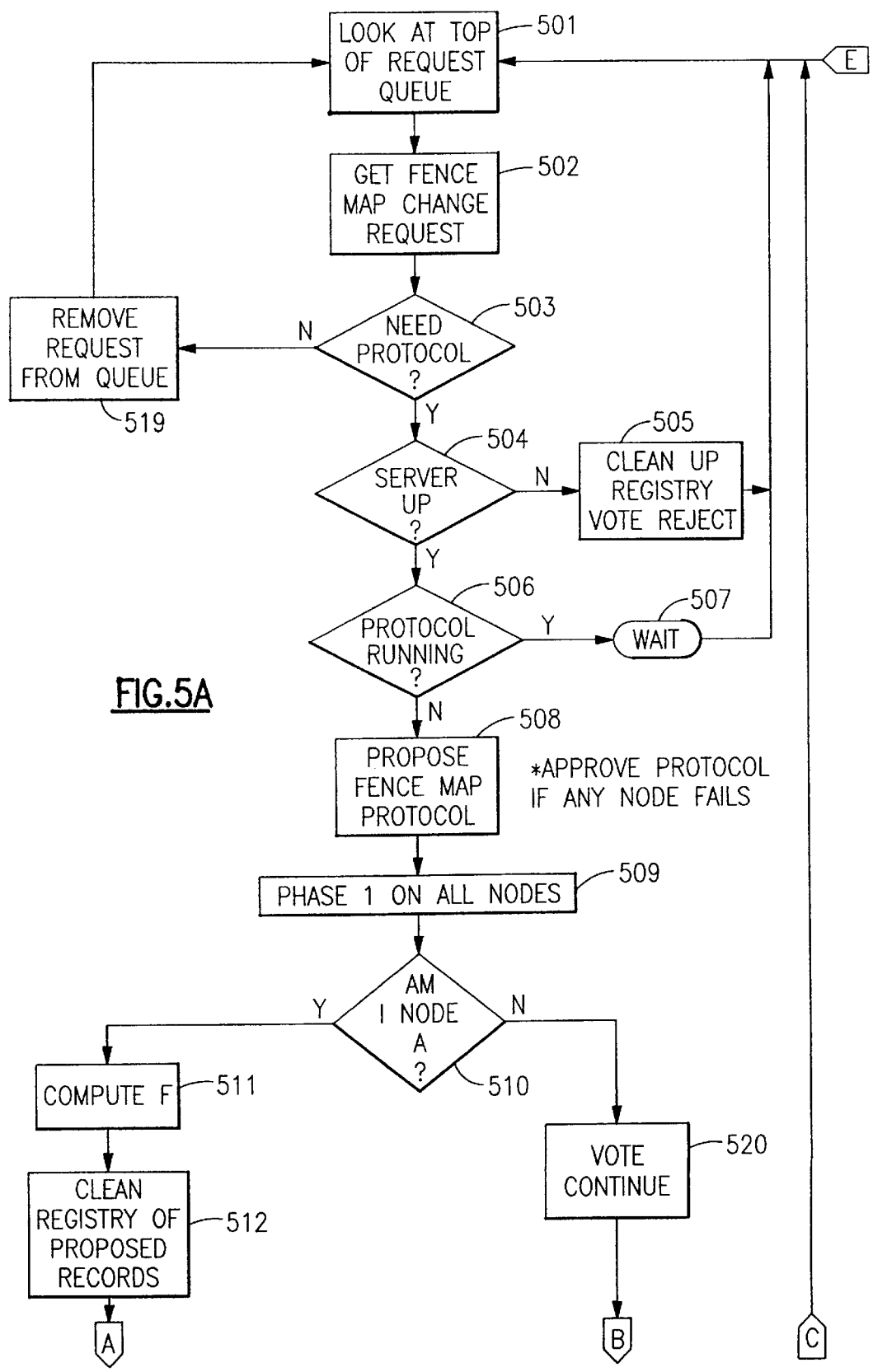
FIGS. 5A–5C, joined by connectors A–E, taken together form a flowchart of the protocol or computer program of the fence/unfence operation of the present invention.
Figure 5B:
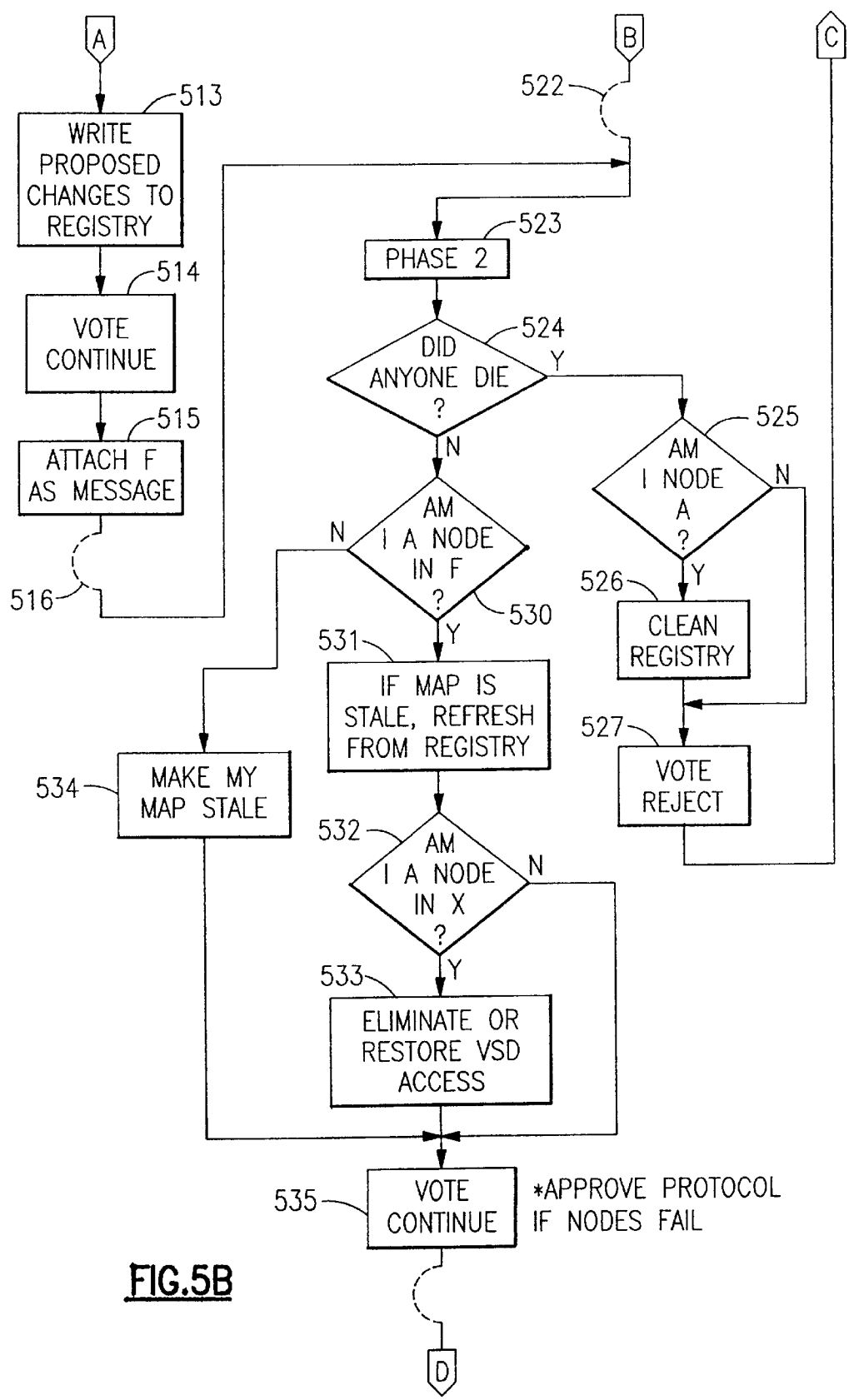
Figure 5C:
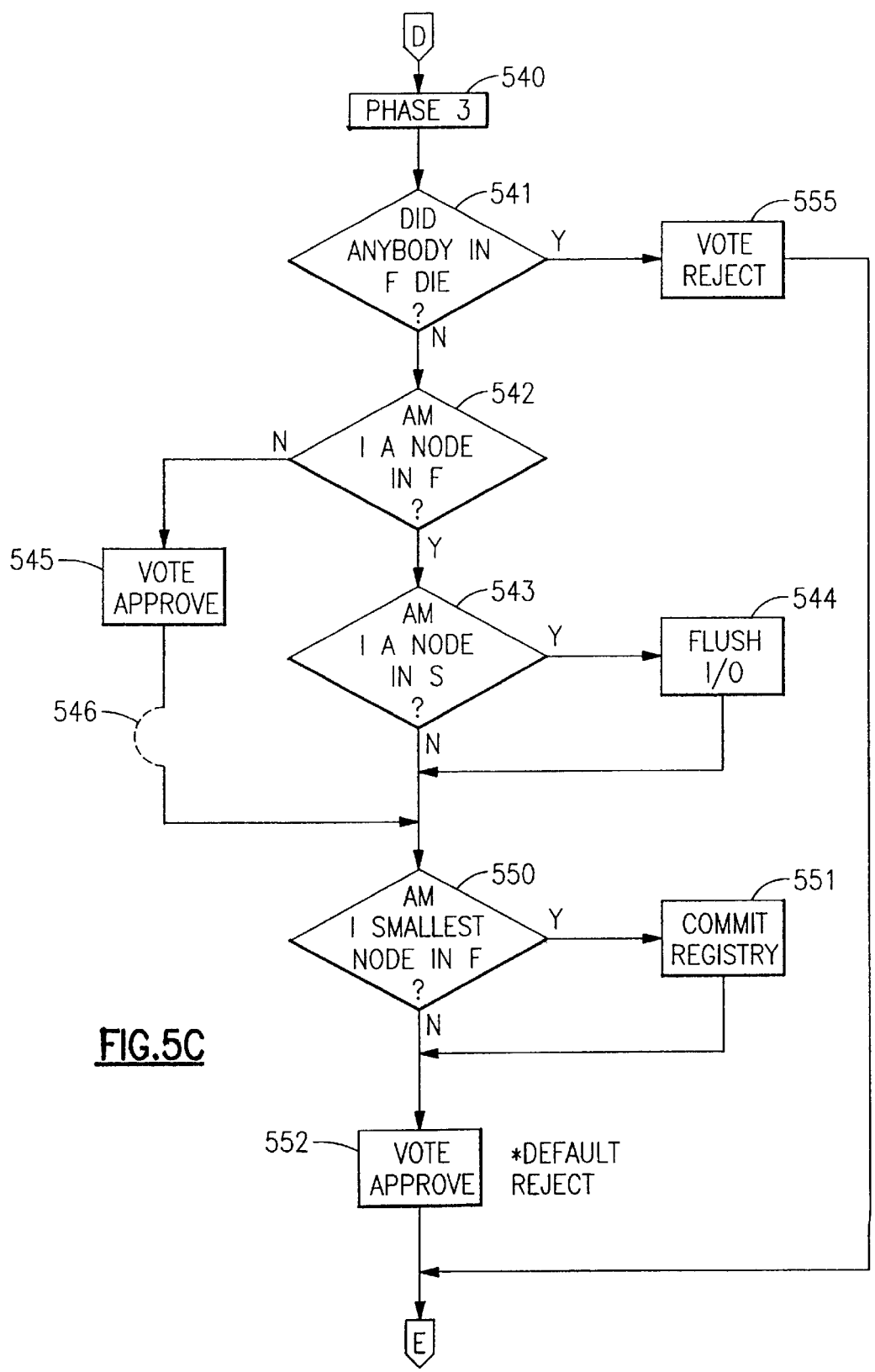

FIGS. 5A–5C joined at connectors A–E form a flowchart for a program to be run on each of the nodes 106 participating in the fencing protocol. At 501, node A looks at the top of the queue request, and at 502 gets any fence map change requests from the top of the queue. Node A checks at 502 to see if the fencing protocol is needed to effect the map change request. If it is not, the request is removed from the queue at 519, and the program returns to 501. If the check at 503 is yes, node A checks at 504 to see if all VSD servers are up. If it is not, at 505 the node A cleans up the registry, votes reject, and returns to 501, causing the protocol to fail. If the servers are up, node A checks at 506 to see if the fencing protocol is running. If the protocol is running, node A waits for a specified time at 507, and returns to 501 to look again at the top of the queue.

Figure 6:
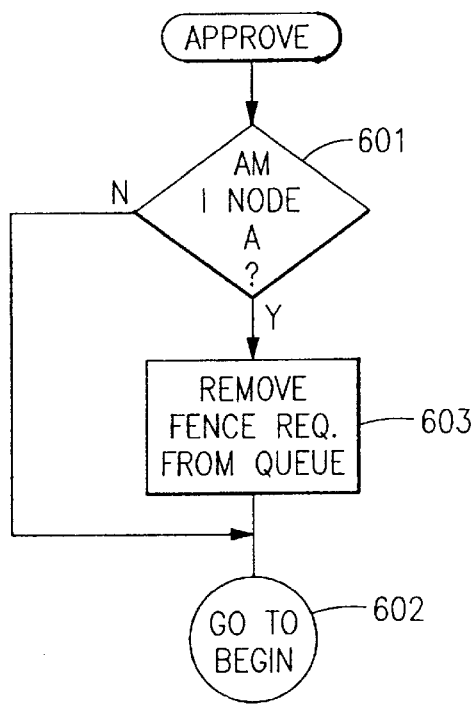
FIG. 6 is a flowchart of an APPEAL protocol of the fence/unfence operation of the present invention.

If the protocol is not running at 506, node A proposes a fence map protocol at 508 which makes an entry for this VSD server with the commit bit set to '1' and the bit map indicating the node to be fenced, if any, after this fence/unfence operation. If any node fails, the APPROVE protocol of FIG. 6 is the default. It will be understood that, if node A proposes changes, and then fails before GS starts the protocol, the fence request will be removed from the queue, as shown at 603 of FIG. 6, as will be explained. Thus, if an application on node A asks for a node to be fenced, but then node A fails, the fencing request will be removed and the application will have to recover node A's instance before the application on node A tries fencing again.

At this point in the protocol, all nodes enter the PHASE 1 state, as shown at 509. At 510, the program checks to see if this node is the A node. If it is, the node computes F at 511, cleans the registry of proposed records (see Table I and FIG. 4) at 512, writes proposed changes to the registry (see 205 at FIG. 3) at 513, votes continue at 514, and attaches F as a message to the nodes in F at 515. The messages are sent by the A node to the F nodes to notify those nodes that they should start the fence/unfence protocol for that node. At 516, the node waits until the other nodes indicate that they are ready to enter PHASE 2 in their protocols.

If the check at 510 is no, the node votes to continue at 520 and waits at 522 for the other nodes to reach PHASE 2 in their protocols. When all of the nodes are ready, they enter PHASE 2 at 523. A check is made at 524 to see if any of the nodes died. If any did die, a check is made at 525 to see if this is node A. If yes, the registry is cleaned at 526, and the node votes REJECT at 527. If the check at 525 is no, the program goes to 527. After 527, the program returns to 501 to look at the top of the request queue for new change requests.

If the check at 524 is no, a check is made at 530 is see if this node is in F. If yes, at 531 the local map for the node is refreshed from the registry if the local map is stale. A check is made at 532 to see if this node is in X. If yes, at 533 the bit map for this entry is updated to eliminate (fence) or restore (unfence) VSD access for this node, depending on the change requested.

If the check at 530 is no, the local map for this node is made stale at 534. If the check at 532 is no, and likewise after 533 and 534, the node votes to continue at 535, and goes to 536 to wait for all of the other nodes to enter PHASE 3. If during PHASE 2, any of the nodes fail, the default is APPROVE.

When all of the nodes are finished with PHASE 2, the node enters PHASE 3 at 540. A check is made at 541 to see if any of the nodes in F died. If no nodes died, the program goes to 542 and checks at 542 to see if this node is in F. If this node is in F, a check is made at 543 to see if this node is in S. If this is a server node in S, at 544 the I/O is flushed for all messages to this node from nodes to be fenced. If at 542, this node is not in F, the node votes APPROVE at 545 and waits at 546 until all other nodes are at this point. Finally, a check is made at 550 to see if this is the smallest numbered node in F. If yes, at 551 the registry is changed to a commit registry by erasing the old commit registry and changing all of the proposed entries to commit entries by changing the commit bit from '0' to '1'. If the check at 550 is no, and after 551, the program goes to 552 where the node votes APPROVE. The default is changed to REJECT, and the program returns to the beginning at 501 to look at the top of the request queue to get the next fence map change request at 502. If a node has died at 541, the program votes REJECT at 555, and returns to the beginning 501.

FIG. 6 is a flowchart of the APPROVE routine. If a node votes APPROVE, a check is made at 601 to see if this node is A. If no, at 602 the program returns to the beginning. If the check at 601 is yes, the program at 603 removes the fence request from the queue, and goes to 602 to return to the beginning.

Figure 7:
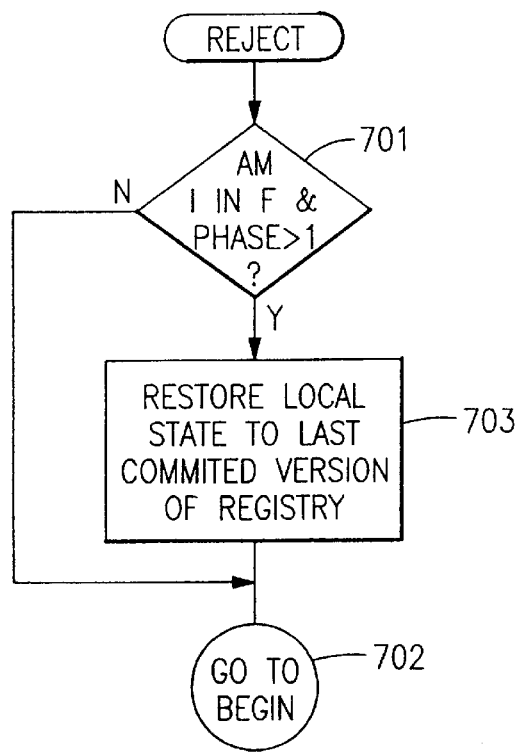
FIG. 7 is a flowchart of a REJECT protocol of the fence/unfence operation of the present invention.

FIG. 7 is a flowchart of the REJECT routine. If a node votes REJECT, a check is made at 701 to see if this node is in F and the phase number is greater than 1. If the check is no, the program goes to 702 to return to the beginning. If the check at 701 is yes, at 703 the program restores the local state to the last committed version of the registry, and goes to 702 to return to the beginning.

While I have illustrated and described the preferred embodiment of my invention, it is to be understood that I do not limit myself to the precise construction herein disclosed, and the right is reserved to all changes and modifications coming within the scope of the invention as defined in the appended claims.

Having thus described my invention, what I claim as new, and desire to secure by Letters Patent is:

1. In a distributed computer system having a plurality of nodes, one of the nodes being a request processing node (A node) and one or more nodes being peripheral device server nodes (S nodes), a common memory for storing a fence map, and local memory in each of said plurality of nodes for storing a local copy of said fence map, a method for fencing or unfencing in a fence/unfence operation, one or more nodes (X nodes) from one or more S nodes, said method comprising:

storing in said common memory said fence map having entries therein, each entry for storing an indication of an S node to be fenced, a commit bit indicating if the entry is proposed or committed, and a bit map indicating which X nodes are to be fenced from the S node of the entry;

processing a request in said A node, said request specifying X nodes to be fenced or unfenced from specified S nodes during said fence/unfence operation;

computing in said A node, the nodes to participate (F nodes) in said fence/unfence operation, said participating nodes including the A node, the X nodes to be either fenced or unfenced from said S nodes, and the S nodes thus fenced or unfenced;

sending messages from said A node to said F nodes instructing each F node to begin said fence/unfence operation for that node;

proposing changes in said fence map in a first phase of said fence/unfence operation, said changes reflecting the fencing or unfencing of said X nodes;

in a second phase in said fence/unfence operation, refreshing the local map of each of the F nodes from the proposed changes in the fence map in said central memory, eliminating access to specified S nodes from specified X nodes to be fenced, if any, and restoring access to specified S nodes with specified X nodes to be unfenced, if any; and in a third phase in said fence/unfence operation, flushing I/O operations from specified X nodes to be fenced from specified S nodes, if any, and a selected one of said F nodes erasing all entries in the fence map of said common memory whose commit bit indicates the entry is committed, and changing all entries whose commit bit indicates the entry is proposed, to a committed entry.

2. The method of claim 1 wherein each node of said plurality of nodes has an identification number, and said erasing is done by the F node with the lowest identification number.

3. The method of claim 1 wherein said second phase includes making the local copies of said plurality of nodes not F nodes stale.

4. The method of claim 1 further comprising initiating said fence/unfence operation by sending from any one of said plurality of nodes, a request to be queued for execution by said A node, thereby requesting the start of a fence/unfence operation.

5. The method of claim 4 wherein said fence/unfence operation includes ending by an APPROVE protocol, said fence/unfence operation in the event that any of said nodes fail in said first phase.

6. The method of claim 5 wherein said APPROVE protocol includes removing said request queued for execution by said A node, when said A node is processed in said fence/unfence operation.

7. The method of claim 6 wherein said second phase includes cleaning, when said A node is processed by said second phase, the fence map in said common memory from all uncommitted entries in the event that any node dies before the beginning of said second phase.

8. The method of claim 7 wherein said fence/unfence operation includes ending by a REJECT protocol, said fence/unfence operation in the event that any node fails in said second or third phases.

9. The method of claim 8 wherein said REJECT protocol includes restoring the local copy of the fence map of F nodes being processed in said fence/unfence operation from the last committed version of the fence map in the common memory in the event that any node fails during said second or third phases.

10. The method of claim 9 wherein said third phase includes calling said APPROVE protocol for nodes in the third phase not F nodes.

* * * * *